United States Patent [19]
Hasan et al.

[11] Patent Number: 5,161,342
[45] Date of Patent: Nov. 10, 1992

[54] FASTENING SYSTEM

[75] Inventors: Syed R. U. Hasan, Palatine; Robert H. Jenkins, Barrington; Frederick A. Kish, Lockport; Juergen O. Rathgeber, Arlington Heights, all of Ill.

[73] Assignee: Illinois Tool Works Inc., Glenview, Ill.

[21] Appl. No.: 631,219

[22] Filed: Dec. 21, 1990

Related U.S. Application Data

[62] Division of Ser. No. 294,324, Jan. 6, 1989, abandoned.

[51] Int. Cl.⁵ .......................... F04D 5/14; F04D 5/06; F04G 21/14
[52] U.S. Cl. ...................... 52/410; 52/408; 52/747
[58] Field of Search ............... 52/408, 409, 410, 746, 52/363, 747

[56] References Cited

U.S. PATENT DOCUMENTS

| | | | |
|---|---|---|---|
| 1,934,651 | 11/1933 | Anderson | 51/410 |
| 4,389,826 | 6/1983 | Kelly | 52/410 |
| 4,437,283 | 3/1984 | Benoit | 52/410 |
| 4,445,306 | 5/1984 | Schauffele | 52/410 |
| 4,493,175 | 1/1985 | Coppola, Jr. | 52/410 |
| 4,712,348 | 12/1987 | Triplett et al. | 52/40b |
| 4,718,211 | 1/1988 | Russell et al. | 52/409 |
| 4,736,562 | 4/1988 | Kelly | 52/410 |
| 4,860,514 | 8/1989 | Kelly | 52/410 |

*Primary Examiner*—Michael Safavi
*Attorney, Agent, or Firm*—Schwartz & Weinrieb

[57] ABSTRACT

In the construction of buildings, multiple super-imposed plastic fastening strips are employed to affix a building member to a substrate.

24 Claims, 2 Drawing Sheets

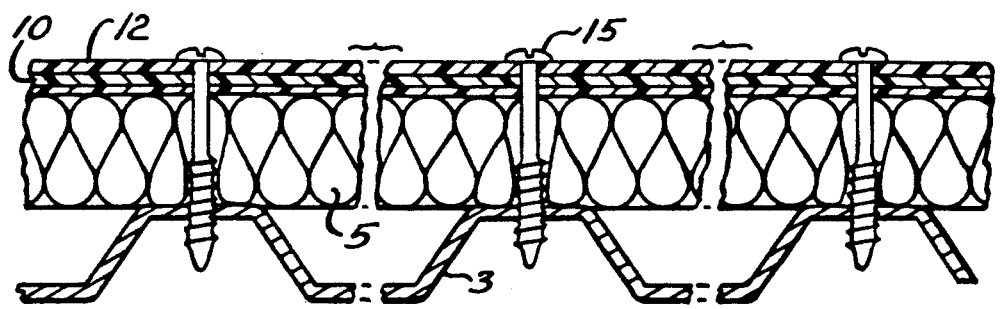
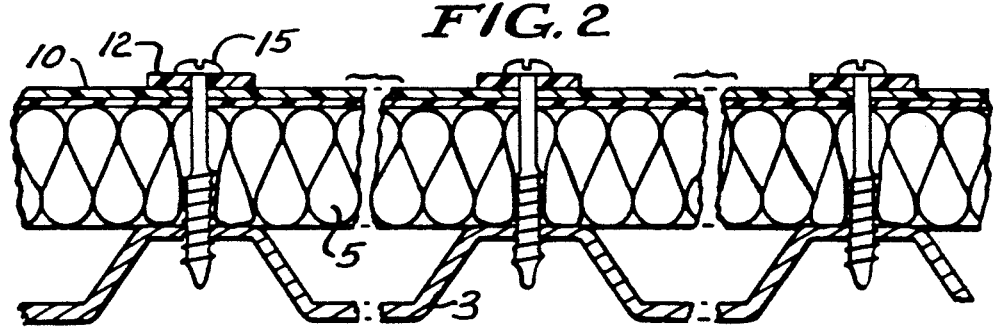
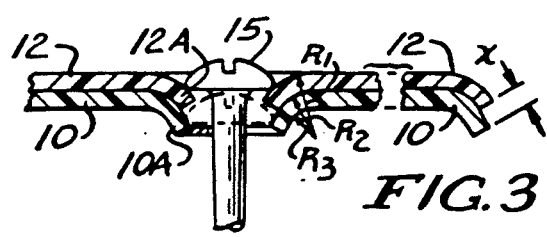
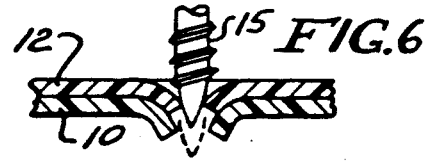
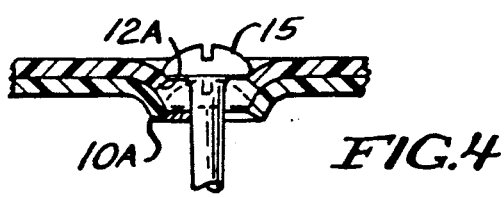
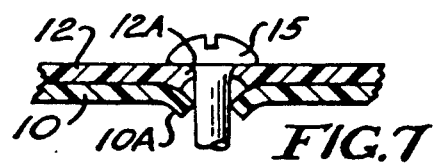
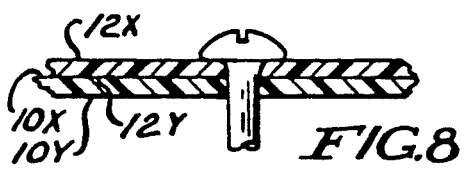
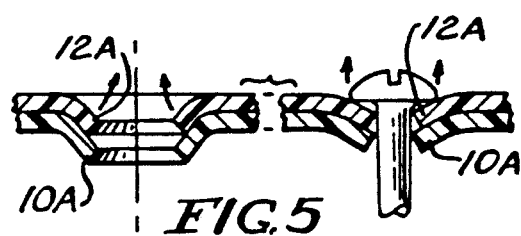
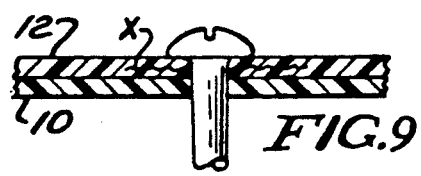

FASTENING SYSTEM

This application is a continuation of application Ser. No. 294,324, filed Jan. 6, 1989 now abandoned.

FIELD OF THE INVENTION

This invention relates to a fastening system useful in building construction.

BACKGROUND OF THE INVENTION

It is well known to use battens in roof construction. Battens are generally metal strips or bars which are used to secure or hold down materials upon building roofs. In constructing roofs, one or more flexible cover membranes, such, as for example, thermoplastic or elastomeric sheets, are placed over a rigid substrate so as to form a part of the roof structure. The flexible membranes serve to seal the roof structure against liquid penetration and also may serve to provide an insulating effect. Such membranes are secured in place by means of batten strips or bars which are placed at spaced intervals over the flexible membrane. Headed fasteners, such as, for example, screws or nails, are then passed downwardly through the batten strips or pre-punched holes therein and the flexible membranes so as to secure the battens and membranes to the roof substrate. The batten strips should be of such nature as to permit a pointed mechanical fastener to pass therethrough without destroying the hold-down effectiveness of the batten bar. Under certain conditions wind can uplift the membrane causing it to pull, upwardly away and thereby, in turn, causing the batten strip to rip or tear about the fastener with the headed fasteners thereby passing through the batten strip so as to no longer secure either the batten strip or the membrane to the roof substrate. The batten bars, to be satisfactory, must exhibit high pull-through resistance, that is, good tear or split resistance at points where pointed mechanical fasteners penetrate the bars.

Batten bars can also be used in accordance with this invention to secure a layer or layers of insulation to a roof substrate or upon vertical building walls. They also can be used to secure flashing upon buildings and in other fastening applications where strips or bars are employed. For example, "batten strips" can be used as termination bars in order to secure membranes to the edges of vertical parapet walls to rough structure along the periphery of the roof. Thus, as used herein the term "batten strip" is not limited to roof battens but includes fastening means in building construction applications where strips or bars are useful in fastening building members.

Roofing batten bars should not unduly curl, kink or distort when penetrated by means of a fastener. Metal batten bars made of sheet metal have been used, but such bars are relatively heavy constituting a relatively dead weight upon the building roof and can be difficult to penetrate by means of a threaded mechanical fastener unless pre-drilled openings are provided therein. Metal bars are also known to corrode and diminish the soundness of the roof structure. Aluminum batten bars have also been used, but are more expensive and unless quite thick are subject to curling, kinking or distortion when penetrated by means of a threaded fastener. Wood battens decay.

Plastic batten strips have also been proposed. U.S. Pat. No. 4,718,211 discloses batten bars of a particular configuration made having plastic. Likewise, U.S. Pat. No. 4,445,306 discloses an elongated fastening bar made of plastic which has a flat batten surface and a convex top surface. The batten strips and fastening bars disclosed in these patents have a thickness at one point of approximately ¼ inch and have pre-drilled holes therein so as to receive the fasteners.

OBJECTS OF THE INVENTION

It is a principal object of this invention to provide a fastening system useful in the construction of buildings.

It is another object of the invention to provide fastening methods which may be quickly and easily carried out so as to secure members in the construction of buildings.

It is another object of this invention to provide methods for applying batten bars to secure elements so as to effectively maintain the function of the batten bars.

It is still another object of the invention to provide novel methods for securing roofing membranes to a roof substrate structure.

BRIEF DESCRIPTION OF THE DRAWINGS

The advantages of the invention will become apparent from the following description taken in conjunction with the accompanying drawings, in which like reference characters designate like or corresponding parts throughout the several views, and wherein:

FIG. 1 is a fragmentary vertical cross-sectional view of a roof structure constructed in accordance with the invention.

FIG. 2 is a view similar to FIG. 1 illustrating a second embodiment of the invention.

FIGS. 3 through 9 illustrate diagrammatically the postulated action of batten bars employed in accordance with this invention when penetrated by mean of a headed mechanical fastener.

DETAILED DESCRIPTION OF THE ILLUSTRATED EMBODIMENTS

Figure 10:
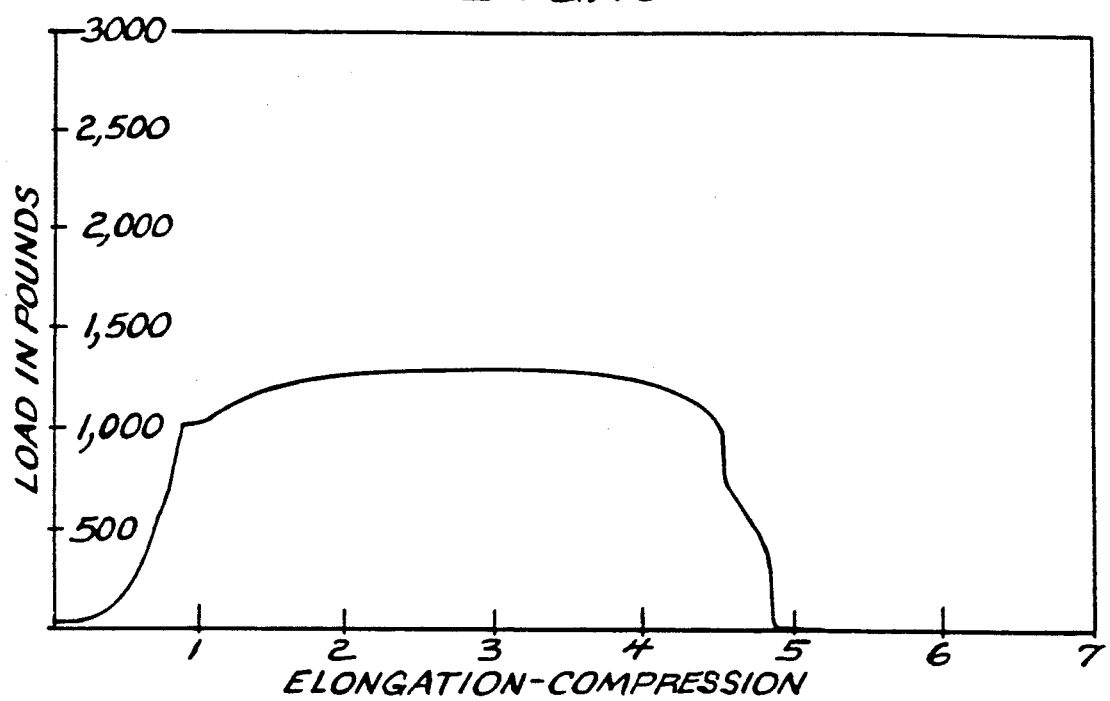
FIG. 10 is a graph plotting elongation-compression versus load of a single plastic batten strip.

Referring to FIG. 1, a conventional corrugated metal roof deck 3 is partially shown, over which there is placed a layer of insulating material 5. Covering the insulation is a flexible sheet membrane 8 which can be fabricated of any suitable flexible water-impervious material. Conventional roofing membranes frequently comprise sheets of polyvinyl chloride, chlorosulfonated polyethylene (Hypalon), neoprene, polyisobutylene and ethylene-propylenediene monomer (EPDM). In order to secure the flexible membrane 8 to the roof substrate in a manner which resists wind uplift, a plurality of superimposed flexible plastic batten strips 10 and 12 are placed at intervals over the membrane. The superimposed batten strips 10 and 12 are penetrated by and fastened to the metal roof deck by mean of headed mechanical fasteners 15.

The batten strips 10 and 12 comprise relatively thin strips of plastic. The thickness of the individual batten bars used in accordance with this invention is less than 200 mils. Typically, the batten strips 10 and 12 each have a thickness of, for example, 20–25 mils and are approximately 1 inch in width, although the dimensions can be varied. The batten strips have substantially flat or planar top and bottom surfaces with no longitudinally extending thickened portions or ribs to restrict bending of the strips along a transverse line.

The batten strips 10 and 12 can be made from a variety of different corrosion resistant extrudable plastic materials, such as, for example, polyvinyl chloride, polyethylene, polypropylene, polycarbonate, nylon and polyesters. A preferred extruded and oriented plastic sheet material from which the batten bars can be cut in desired length and width is described in copending patent application Ser. No. 294,325 filed Jan. 6, 1989, now U.S. Pat. No. 4,963,430 the disclosure of which is incorporated herein by reference thereto.

In order to afford optimum benefits, particularly with respect to preventing the headed fasteners passing through the battens under strong wind uplift conditions, it is important that the batten strips not be so rigid as to be incapable of bending or flexing in response to forces tending to pull the flexible sheet membrane and the battens upwardly past the headed fasteners. It has been found that a plurality of superimposed thin batten strips afford significantly greater resistance to pull-through than does a single batten strip of the same thickness. For example, it has been found:

|  | Pull-through Resistance (lbs.) | |
| --- | --- | --- |
|  | Single Ply | Double Ply |
| 34 mil thick plastic batten with #11 fastener | 236 | 510 |
| 22 mil thick plastic batten with #11 fastener | 155 | 328 |
| 25 mil thick plastic batten with #12 fastener | 260 | 562 |

Pull-through resistance is the force required to cause the batten strip to rip or tear about the fastener with the headed fastener pulling relatively through the batten strip.

In connection with the practice of the present invention, at least two superimposed batten strips are employed, at least within the vicinity of the fasteners. FIG. 1 shows two batten bars 10 and 12 which are coterminous in length whereas FIG. 2 shows another embodiment of the invention in which a multiplicity of batten bars is employed only within the area surrounding the entry of the headed fasteners. A multi-layer system of batten bars developed in accordance with the invention can be formed of unattached separate superimposed batten strips, or a laminate of two or more batten bars can be formed by intimately bonding together two or more batten bars. For example, a plurality of batten strips can be bonded together in superimposed relationship by solvent adhesives, ultrasonic welding, co-extrusion, hot melt adhesives and the like. Due to the unexpected beneficial advantages of the batten system of this invention, the batten strips need not be pre-drilled at specified intervals in order to receive the headed fasteners. This affords greater flexibility in the use of the batten bars in building construction, namely that the fasteners can be located and spaced as desired.

FIGS. 3 through 9 of the drawings illustrate diagrammatically postulated actions of the batten bars employed in accordance with this invention when penetrated by means of a headed mechanical fastener.

Thus, FIGS. 3 and 4 graphically illustrate that with the use of a plurality of superimposed flexible batten strips, resistance to fastener pull-through is believed to increase because of an increase in the number of edges through which the head of the fastener must pass to pull-out. Thus, as the head of the fastener is pulled relatively downwardly through the superimposed batten strips, bending of the flexible battens occurs, with the radius of curvature ($R_3$) of the lowermost batten 10 being smaller than the radius of the curvature ($R_2$) of the uppermost batten 12. In order to compensate for the change in radius upon bending, the lowermost batten strip 10 projects inwardly creating another edge 10A which, along with batten edge 12A, resists relative pull-through of the headed fastener. Thus, with the multi-ply batten arrangement, the headed fastener meets resistance to pull-through by means of both edges 10A and 12A.

Likewise, it is postulated that the plastic batten strips of the invention, being flexible and bendable unlike rigid materials such as metals or wood, tend to return to their original unbent position as illustrated in FIG. 5. Thus, the leading edges 10A and 12A of the batten bars 10 and 12, after being bent downwardly as the fastener penetrates therethrough, tend to return in the direction of the arrows to their previous unbent condition, thereby exerting an upward force against the head of the fastener.

Headed fasteners, such as, for example, nails or screws, used to secure batten bars to substrate materials generally have a pointed penetrating end. As can be seen in FIG. 6, the flexible multi-ply batten strips used according to this invention are believed to inherently flex or bendably yield with respect to the penetrating point of the fastener rather than abruptly tear as, for example, is the case with rigid battens such as metal batten bars. Accordingly, the hole produced with each one of the superimposed batten strips is actually smaller than the external diameter of the penetrating fastener. The flexible plastic batten strips thus exert more clamping force on the fastener, thereby affording greater resistance to back-out of the fastener from the strips.

As seen in FIG. 7, the superimposed flexible batten strips are thought to bend as the headed fastener 15 penetrates therethrough and the bending edges 10A and 12A follow the contour of the underside of the fastener 15 presenting an increased contact area between the battens and the fastener. Since the pressure required to cause the fasteners to pull through the battens is inversely proportional to the area of contact defined therebetween, the arrangement of batten strips in accordance with this invention, by providing a greater area of contact, increases the pressure required to cause pull-through or back-out of the fastener.

It is believed also from FIG. 8 that the multiple layer arrangement of batten strips presents greater contractile forces (surface tension) due to a greater number of surfaces 12X, 12Y, 10X and 10Y than is the case with a single batten strip. This again provides greater pull-through resistance to the fastener head during conditions of high wind uplift.

FIG. 9 illustrates graphically that should one of the superimposed batten strips crack or split, the crack X does not propagate to the next adjacent batten strip due to its own independent surface tension.

FIG. 10 is a graph showing the elongationcompression/load of a single metal batten strip having a thickness of 0.060 inch.

Figure 11:
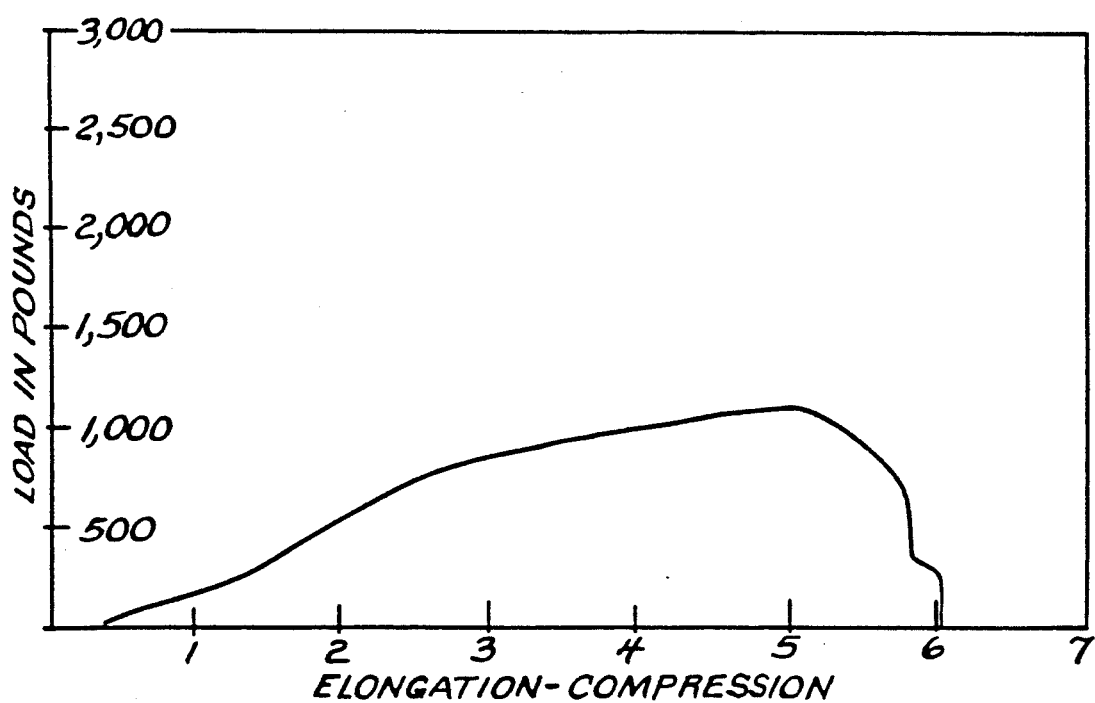
FIG. 11 is a graph plotting elongation-compression versus load of two superimposed plastic batten strips.

FIG. 11 is a graph showing the elongationcompression/load of two superimposed plastic batten strips each having a thickness of 0.030 inch. As can be seen, the area under the curve is less for the two-ply batten arrangement indicating greater flexibility than exhibited by the single metal batten strip. The more flexible the batten arrangement, the less tendency to experience fatigue under wind loads.

Obviously, many modifications and variations of the present invention are possible in light of the above teachings. It is therefore to be understood that within the scope of the appended claims, the present invention may be practiced otherwise than as specifically described herein.

What is claimed is:

1. A method of building construction, comprising the steps of:
    disposing a building member upon a substrate such that said building member can be affixed to said substrate by means of a plurality of mechanical fasteners, arranged in a plurality of laterally spaced, longitudinally extending rows;
    disposing a flexible, water-impervious sheet membrane over said building member so as to seal said building member and said substrate against liquid penetration;
    disposing a plurality of narrow, elongated, superimposed, flexibly resilient, plastic batten fastening strips, separate and distinct from said sheet membrane and identical with respect to each other in that said plurality of superimposed, plastic batten fastening strips exhibit the same flexibility, resiliency, and bendability properties at locations where said mechanical fasteners are disposed such that at least one of said plurality of superimposed, plastic batten fastening strips extends longitudinally between successive ones of said mechanical fasteners disposed within said plurality of laterally spaced, longitudinally extending rows; and
    inserting said plurality of mechanical fasteners such that said plurality of mechanical fasteners penetrate said plurality of superimposed, plastic batten fastening strips, said sheet membrane, said building member, and said substrate in such a manner that sidewall portions of holes defined within said plurality of superimposed, plastic batten fastening strips and disposed about shank portions of said mechanical fasteners all flexibly and resiliently engage said shank portions of said mechanical fasteners in order to increase pull-out resistance of said mechanical fasteners with respect to said plurality of superimposed, plastic batten fastening strips.

2. A method in accordance with claim 1 wherein the fastening strips have substantially flat planar top and bottom surfaces.

3. A method in accordance with claim 1 wherein a layer of insulating material is the building member affixed to said substrate.

4. A method in accordance with claim 1 wherein a layer of insulating material is the building member affixed to a roof substrate.

5. A method in accordance with claim 1 wherein a layer of insulating material is the building member affixed to said substrate which is a vertically extending building wall.

6. A method in accordance with claim 1 wherein flashing is the building member affixed to said substrate.

7. A method in accordance with claim 1 wherein the thickness of the individual plastic batten strips is less than 200 mils.

8. A method as set forth in claim 5, wherein:
    said roof substrate comprises a corrugated metal roof deck.

9. A method as set forth in claim 1, wherein:
    said plurality of superimposed, plastic batten fastening strips are fabricated from a plastic material chosen from the group of polyvinyl chloride, polyethylene, polypropylene, polycarbonate, nylon, and polyester.

10. A building structure system, comprising:
    a building structure substrate;
    a building member disposed upon said building structure substrate;
    a flexible, water-impervious sheet membrane disposed upon said building member so as to seal said building member and said building structure substrate against liquid penetration, and capable of being affixed to said building structure substrate by means of a plurality of mechanical fasteners arranged in a plurality of laterally spaced, longitudinally extending rows;
    a plurality of narrow, elongated, superimposed, flexibly resilient, plastic batten fastening strips, separate and distinct from said sheet membrane and identical with respect to each other in that said plurality of superimposed, plastic batten fastening strips exhibit the same flexibility, resiliency, and bendability properties, disposed atop said sheet membrane at locations where said mechanical fasteners are disposed such that at least one of said superimposed, plastic batten fastening strips extends longitudinally between successive ones of said mechanical fasteners disposed within said plurality of laterally spaced, longitudinally extending rows; and
    a plurality of mechanical fasteners for penetrating said plurality of superimposed, plastic batten fastening strips, said sheet membrane, said building member, and said substrate, so as to fix said plurality of superimposed, plastic batten fastening strips, said sheet membrane, and said building member to said substrate, in such a manner that sidewall portions of holes defined within said plurality of superimposed, plastic batten fastening strips and disposed about shank portions of said mechanical fasteners all flexibly and resiliently engage said shank portions of said mechanical fasteners in order to increase pull-out resistance of said mechanical fasteners with respect to said plurality of superimposed, plastic batten fastening strips.

11. A system as set forth in claim 10, wherein:
    said substrate comprises a corrugated metal roof deck.

12. A system as set forth in claim 10, wherein:
    said fastening strips have substantially flat planar top and bottom surfaces.

13. A system as set forth in claim 10, wherein:
    said fastening strips each have a thickness of less than 200 mils.

14. A system as set forth in claim 13, wherein:
    said thickness of each one of said separate and distinct fastening strips is approximately 25 mils.

15. A system as set forth in claim 10, wherein:
    said building member comprises insulation.

16. A system as set forth in claim 10, wherein each one of said fastening strips comprises a strip of an extruded and oriented composition comprising 80–97% by weight of polyethylene terephthalate, 3–20% of polypropylene, and 1–5% of a carboxylated polyolefin.

17. A system as set forth in claim 10, wherein:

each one of said fastening strips is approximately one inch wide.

18. A system as set forth in claim 10, wherein:
said plurality of superimposed, plastic batten fastening strips comprise a plastic material selected from the group of polyvinyl chloride, polyethylene, polypropylene, polycarbonate, nylon, and polyester.

19. A method of forming a water-impervious building structure, comprising the steps of:
disposing a flexible water-impervious sheet onto a substrate so as to seal said substrate aginst liquid penetration, said flexible water-impervious sheet being capable of being affixed to said substrate by means of a plurality of mechanical fasteners arranged in a plurality of laterally spaced, longitudinally extending rows;
disposing a flexibly resilient, plastic batten fastening strip means onto said flexible, water-impervious sheet, said plastic batten fastening strip means comprising at least two distinct layers identical with respect to each other, in cross-section at locations where said mechanical fasteners are disposed, in that said at least two distinct layers of said plastic batten fastening strip means exhibit the same flexibility, resiliency, and bendability properties; and
inserting said plurality of mechanical fasteners through said at least two distinct layers of said plastic batten fastening strip means so as to penetrate said at least two distinct layers of said plastic batten fastening strip means, said underlying water-impervious sheet, and said substrate so as to securely fasten said water-impervious sheet to said substrate.

20. A method as set forth in claim 19, wherein:
said substrate is a roofing substrate and said building structure is a roofing structure.

21. A method as set forth in claim 19, wherein:
said plastic batten fastening strip means is fabricated from a plastic material selected from the group of polyvinyl chloride, polyethylene, polypropylene, polycarbonate, nylon, and polyester.

22. A building structure system, comprising:
a building structure substrate;
a flexible, water-impervious sheet membrane disposed upon said building structure substrate so as to seal said substrate against liquid penetration, said flexible, water-impervious sheet membrane being capable of being affixed to said substrate by means of a plurality of mechanical fasteners arranged in a plurality of laterally spaced, longitudinally extending rows;
a flexibly resilient, plastic batten fastening strip means disposed upon said flexible, water-impervious sheet membrane and comprising at least two distinct layers identical with respect to each other, in cross-section at locations at which said mechanical fasteners are disposed, in that said at least two distinct layers of said plastic batten fastening strip means exhibit the same flexibility, resiliency, and bendability properties; and
a plurality of mechanical fasteners for penetrating said plastic batten fastening strip means comprising said at least two distinct layers of said plastic batten fastening strip means, said underlying water-impervious sheet membrane, and said substrate so as to securely fasten said water-impervious sheet membrane to said substrate.

23. A building structure system as set forth in claim 22, wherein:
said substrate is a roofing substrate and said building structure is a roofing structure.

24. A system as set forth in claim 22, wherein:
said plastic batten fastening strip means comprises a plastic material selected from the group of polyvinyl chloride, polyethylene, polypropylene, polycarbonate, nylon, and polyester.

* * * * *